Jan. 31, 1933.   C. SCHNELL   1,895,866
MOTOR TRUCK
Filed Nov. 12, 1931
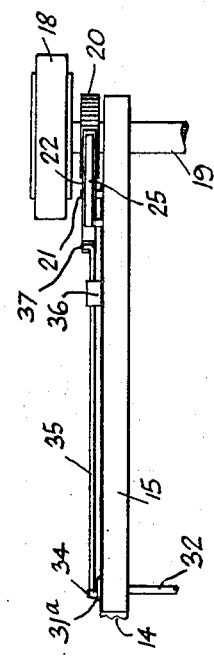
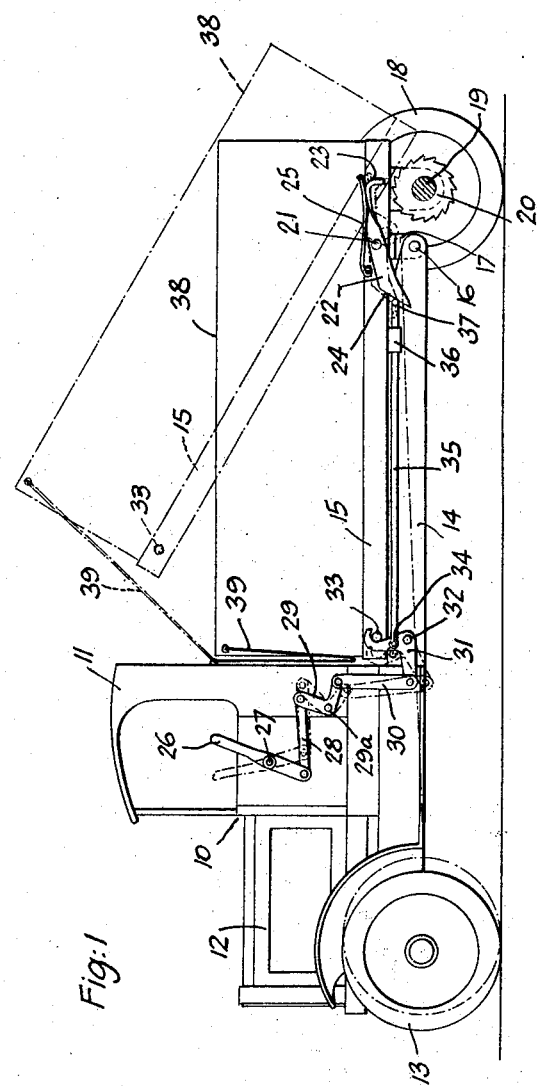
CONRAD SCHNELL
INVENTOR
BY Walter E. Woelheim
ATTORNEY Patented Jan. 31, 1933

1,895,866

UNITED STATES PATENT OFFICE

CONRAD SCHNELL, OF WOODHAVEN, NEW YORK

MOTOR TRUCK

Application filed November 12, 1931. Serial No. 574,528.

This invention relates to trucks and more particularly to chassis therefor, adapted to be used with truck bodies the contents of which have to be dumped.

In apparatus of this kind heretofore in use, the forward end of the body was usually raised by means of a hydraulic or screw hoist or similar means well known in the art. It is the particular purpose of the invention to provide the truck chassis with means by which the body resting upon the chassis can be elevated to any desired position without the use of a hoist. Another object is to make this invention particularly applicable to trucks of the underslung type. A further object is to provide a chassis which is made of essentially two units, one the motor or power unit and the other the body unit, both of which can easily be disconnected, so that repairs to either unit can readily be made in different places or departments of repair shops. Still other objects will become apparent in the following specification and the accompanying drawing in which a preferred embodiment is described and shown.

In the drawing,

Fig. 1 is an elevational view of a motor truck embodying my improvements, the left rear wheel being omitted for sake of clearness to show the novel means for lifting the truck body at an angle for dumping purposes. All the various parts are shown in elementary form only in more or less diagrammatic style. In dotted lines in the same figure is shown the truck body in a tilted position ready for dumping, and also the operating lever mechanism in an unlocked position just prior to elevating the body, as well as the front wheel and the lower edge of the beam upon which the body support is resting in a position which they assume when the body is elevated as shown; and Fig. 2 is a fragmentary plan view of the right side portion of the chassis.

Like characters of reference denote similar parts throughout the several views and the following specification.

10 is a power unit of a motor truck comprising a cab 11, a hood covered engine 12, a pair of front wheels 13, and a pair of rearwardly extending beams 14. 15 are frame members resting upon beams 14, to the rear ends of which they are pivotally connected by means of pins 16 supported by journals 17 at the underside of the frame members. 18 are rear wheels mounted upon an axle 19 which is fastened to the underside of the frame members 15. 20 are ratchet wheels mounted upon axle 19 and keyed or otherwise suitably fastened to the rear wheels 18 so that they will move in unison therewith. Upon a pin 21 at both sides of the frame members 15 is pivotally fastened a substantially horizontally disposed spring lever 22, its rearwardly extending end bent at an angle at 23, while its forward end terminates in a cam like face 24. 25 is a flat spring attached to each frame member 15 urging the rearwardly extending end 23 downwardly.

26 is an operating lever mounted upon a pivot 27 near the driver's seat in the cab. A horizontal lever 28 connects operating lever 26 with an L shaped lever 29 pivoted at 29a and connected by a vertical bar 30 to another L shaped lever 31 fulcrumed upon a shaft 32 which extends across both beams 14. Lever 31 is hook shaped at its top to engage a pin 33 in the front end of each of the frame members. Upon the other end of the shaft 32 is a similar lever 31a which, however, is crank shaped only. At a point between the hook shaped ends of levers 31 and 31a and shaft 32, each one of the levers has pivoted to it by means of a pin 34 a push rod 35 which is guided at the side of each of the beams 14 by a bracket 36. The extreme rear end of the rod 35 is bent over at 37 and engages each of the cam like faces 24 of the spring levers 22.

The operation of the apparatus is as follows:

The position shown in full lines in Fig. 1 is the normal one for a truck while in motion. Should it be desired to dump the contents of the body, the truck is stopped and the operating lever brought by the driver into the position shown in dotted lines in the same figure. This unlocks the levers 31 and 31a from pins 33. This movement simultaneously disengages rods 35 from cam faces 24 of each of the spring levers 22, when springs 25 force levers 22 downwardly and cause ends 23 of these levers to engage ratched wheels 20. The truck is then reversed, and because the ratchet wheels 20 travel in unison with wheels 18, the frame members 15 rotate upon the axle 19 forced to do so by the spring levers 22 engaging the teeth of the ratchet wheels 20. While this takes place, the front or power unit of the truck is slightly inclined as shown in dotted lines in Fig. 1 for the bottom edge of the beams 14, being forced into this position by the rearward motion of the front wheels and by the slight elevating of the journals 17 about the fulcrum 16, until a body 38 which is fastened upon the frame members 15 is at the desired angle ready for dumping. A safety chain 39 may be provided for to limit the angle of elevation.

After dumping the truck is again driven forwardly until the frame members again rest upon the beams 14, during which travel the spring levers 22 merely rest, respectively, slide upon the faces of the ratchet wheels 20. When back in the normal position, the driver locks the frame members to the beams by simply throwing over again the operating lever 26 into its initial position in which levers 31 and 31a again engage pins 32 and push rods contact with cam faces 24 of spring levers 22 and thus disengage spring levers 22 from ratchet wheels 20.

It is obvious that should it be desired to repair either the power unit or the body unit, they can easily be disconnected by simply pulling out the pins 16. This enables the individual units to be repaired in different departments of repair shops with a saving of time, or new power or body units may readily be interchanged for such needing repairs.

I have shown in the drawing and described in the specification an embodiment of the principles of the invention in diagrammatic form only, that is, made up of devices which are more or less elementary, and the details of which may be greatly varied, and mechanical equivalents may be substituted for any or all of them. I therefore wish it to be understood that many changes in form, proportions, minor details and combination of parts may be resorted to without departing from or sacrificing any of the advantages of the invention as defined in the appended claims.

What I claim as new is:

1. A motor truck comprising a power unit consisting of a supporting structure for an engine, front wheels and driver's seat having a rearward extension, a body frame, a body fastened thereto, rear wheels supporting the frame, the said frame being pivotally connected to the said extension, ratchet wheels rotating in unison with the said rear wheels and coaxially mounted therewith, means fastened to the said frame adapted to engage the ratchet wheels for purposes of tilting the said frame when the truck is driven rearwardly, and operating means at the power unit connected to the said means.

2. A motor truck comprising a power unit consisting of a supporting structure for an engine, front wheels and driver's seat having a rearward extension, a body frame, a body fastened thereto, rear wheels supporting the frame, the said frame being pivotally and detachably connected to the said extension, ratchet wheels rotating in unison with the said rear wheels and coaxially mounted therewith, means fastened to the said frame adapted to engage the ratchet wheels for purposes of tilting the said frame when the truck is driven rearwardly, and a lever at the power unit operably connected to the said means.

3. A motor truck comprising a power unit consisting of a supporting structure for an engine, front wheels and driver's seat having a rearward extension, a body frame, a body fastened thereto, rear wheels supporting the frame, the said frame being pivotally connected to the said extension, ratchet wheels rotating in unison with the said rear wheels, means fastened to the said frame adapted to engage the ratchet wheels for purposes of tilting the said frame when the truck is driven rearwardly, operating means at the power unit connected to the said means, and a locking device between the said extension and frame operably connected to the said operating means.

4. A motor truck comprising a power unit consisting of a supporting structure for an engine, front wheels and driver's seat having a rearward extension, a body frame, a body fastened thereto, rear wheels supporting the frame, the said frame being pivotally connected to the said extension, ratchet wheels rotating in unison with the said rear wheels, means fastened to the said frame adapted to engage the ratchet wheels for purpose of tilting the said frame when the truck is driven rearwardly, operating means at the power unit connected to the said means, a locking device between the said extension and frame operable by the said operating means, and means limiting the extent of the tilting movement of said frame.

Signed at Brooklyn, in the county of Kings and State of New York, this 5th day of November, A. D. 1931.

CONRAD SCHNELL.